(12) United States Patent
Son et al.

(10) Patent No.: US 8,479,102 B2
(45) Date of Patent: Jul. 2, 2013

(54) APPARATUS AND METHOD FOR SETTING USER INTERFACE ACCORDING TO USER PREFERENCE

(75) Inventors: Kyoung-ho Son, Suwon-si (KR); Dong-shin Jung, Suwon-si (KR); Jae-shin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 930 days.

(21) Appl. No.: 11/717,642

(22) Filed: Mar. 14, 2007

(65) Prior Publication Data

US 2007/0271522 A1   Nov. 22, 2007

(30) Foreign Application Priority Data

May 22, 2006   (KR) ........................ 10-2006-0045850

(51) Int. Cl.
   *G06F 3/00*   (2006.01)
(52) U.S. Cl.
   USPC .......................................... 715/744; 715/746
(58) Field of Classification Search
   USPC ................................................ 715/746, 744
   See application file for complete search history.

(56) References Cited

U.S. PATENT DOCUMENTS

| 5,606,702 | A | * | 2/1997 | Diel et al. ..................... 719/329 |
| 6,151,606 | A | * | 11/2000 | Mendez ........................ 707/201 |
| 6,668,354 | B1 | * | 12/2003 | Chen et al. ..................... 715/255 |
| 7,185,238 | B2 | * | 2/2007 | Wedel et al. .................... 714/100 |
| 7,222,062 | B2 | * | 5/2007 | Goud et al. ..................... 703/23 |
| 7,380,119 | B2 | * | 5/2008 | Bade et al. ..................... 713/155 |
| 7,535,475 | B2 | * | 5/2009 | Sorotokin et al. ............ 345/581 |
| 7,571,391 | B2 | * | 8/2009 | Roessler ........................ 715/764 |
| 2002/0184619 | A1 | * | 12/2002 | Meyerson ........................ 717/173 |
| 2003/0081005 | A1 | * | 5/2003 | Lin et al. ........................ 345/781 |
| 2003/0137539 | A1 | * | 7/2003 | Dees ............................. 345/762 |
| 2003/0160821 | A1 | | 8/2003 | Yoon |
| 2004/0090597 | A1 | * | 5/2004 | De Haan ......................... 352/43 |
| 2005/0005243 | A1 | * | 1/2005 | Olander et al. ................. 715/747 |
| 2005/0102429 | A1 | * | 5/2005 | Pinhas et al. ................... 709/248 |

(Continued)

FOREIGN PATENT DOCUMENTS

| JP | 2002-108528 A | 4/2002 |
| JP | 2003-005883 A | 1/2003 |

(Continued)

OTHER PUBLICATIONS

Communication, dated Apr. 2, 2013, issued by the European Patent Office in counterpart European Application No. 07108422.2.

(Continued)

*Primary Examiner* — Ryan Pitaro

(74) *Attorney, Agent, or Firm* — Sughrue Mion, PLLC

(57) ABSTRACT

Provided are an apparatus and method for setting a user interface according to user preferences, more particularly, an apparatus and method for setting the user interface according to the user preferences, in which the user interface can be set up by reflecting the user preferences, and the set user interface is synchronized in order to be used in other devices. The apparatus includes a user-interface-configuration unit that is notified of an update and rearrangement of a predetermined user interface element by a user, a user-information-management unit that manages security information of the user that reconfigures the user interface element, and a user-interface-tree-management unit that reconfigures a predetermined user-interface tree based on the reconfigured user-interface element.

28 Claims, 10 Drawing Sheets

U.S. PATENT DOCUMENTS

| | | | |
|---|---|---|---|
| 2005/0102626 A1* | 5/2005 | Novak et al. | 715/744 |
| 2005/0265531 A1* | 12/2005 | Mika | 379/201.01 |
| 2006/0048194 A1* | 3/2006 | Poslinski | 725/81 |
| 2006/0090130 A1* | 4/2006 | Bent et al. | 715/530 |
| 2006/0117267 A1* | 6/2006 | Koralski et al. | 715/767 |
| 2006/0135196 A1* | 6/2006 | Oh et al. | 455/550.1 |
| 2006/0143297 A1* | 6/2006 | Korhonen et al. | 709/227 |
| 2006/0154649 A1* | 7/2006 | Pedersen et al. | 455/412.1 |
| 2006/0206533 A1* | 9/2006 | MacLaurin et al. | 707/200 |
| 2007/0055925 A1* | 3/2007 | Giannetti | 715/511 |
| 2007/0097138 A1* | 5/2007 | Sorotokin et al. | 345/581 |
| 2007/0127723 A1* | 6/2007 | Grobman | 380/278 |
| 2008/0016464 A1* | 1/2008 | Gao et al. | 715/825 |
| 2008/0086728 A1* | 4/2008 | Lam et al. | 718/1 |
| 2008/0182628 A1* | 7/2008 | Lee et al. | 455/566 |
| 2009/0063660 A1* | 3/2009 | Fleischman et al. | 709/219 |

FOREIGN PATENT DOCUMENTS

| | | |
|---|---|---|
| JP | 2003-032086 A | 1/2003 |
| JP | 2003-307422 A | 10/2003 |
| KR | 10-2002-0078400 A | 10/2002 |
| KR | 1020030070685 A | 9/2003 |
| KR | 1020030077275 A | 10/2003 |
| KR | 10-2005-0074763 A | 7/2005 |
| WO | 2004/054298 A1 | 6/2004 |

OTHER PUBLICATIONS

De Jonge, Merijn. "Multi-level Component Composition", in 2nd Groningen Workshop on Software Variability Modeling (SVM'04), Research Institute of Computer Science and Mathematics, University of Groningen, 2004, Dec. 1, 2004, pp. 1-11, XP055056979.

Ommering, R. et al., "The Koala Component Model for Consumer Electronics Software," Computer, IEEE Service Center, Los Alamitos, CA, US, vol. 33, No. 3, Mar. 1, 2000, pp. 78-85, XP001075153, ISSN: 0018-9162.

Frakes, W.B. et al., "Software reuse research: Status and Future," IEEE Transactions on Software Engineering, vol. 31, No. 7, Jul. 1, 2005, pp. 529-536, XP055057035, ISSN: 0098-5589.

* cited by examiner

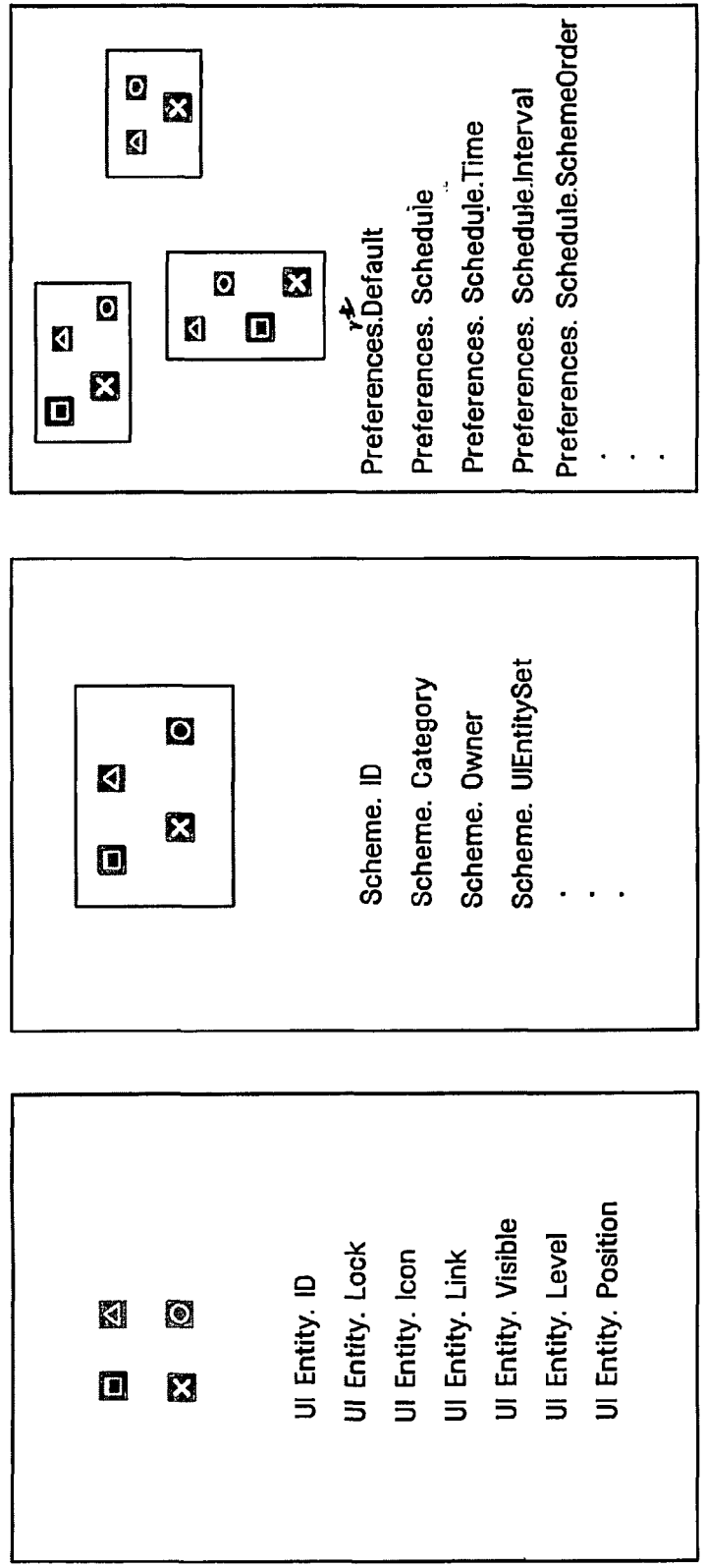

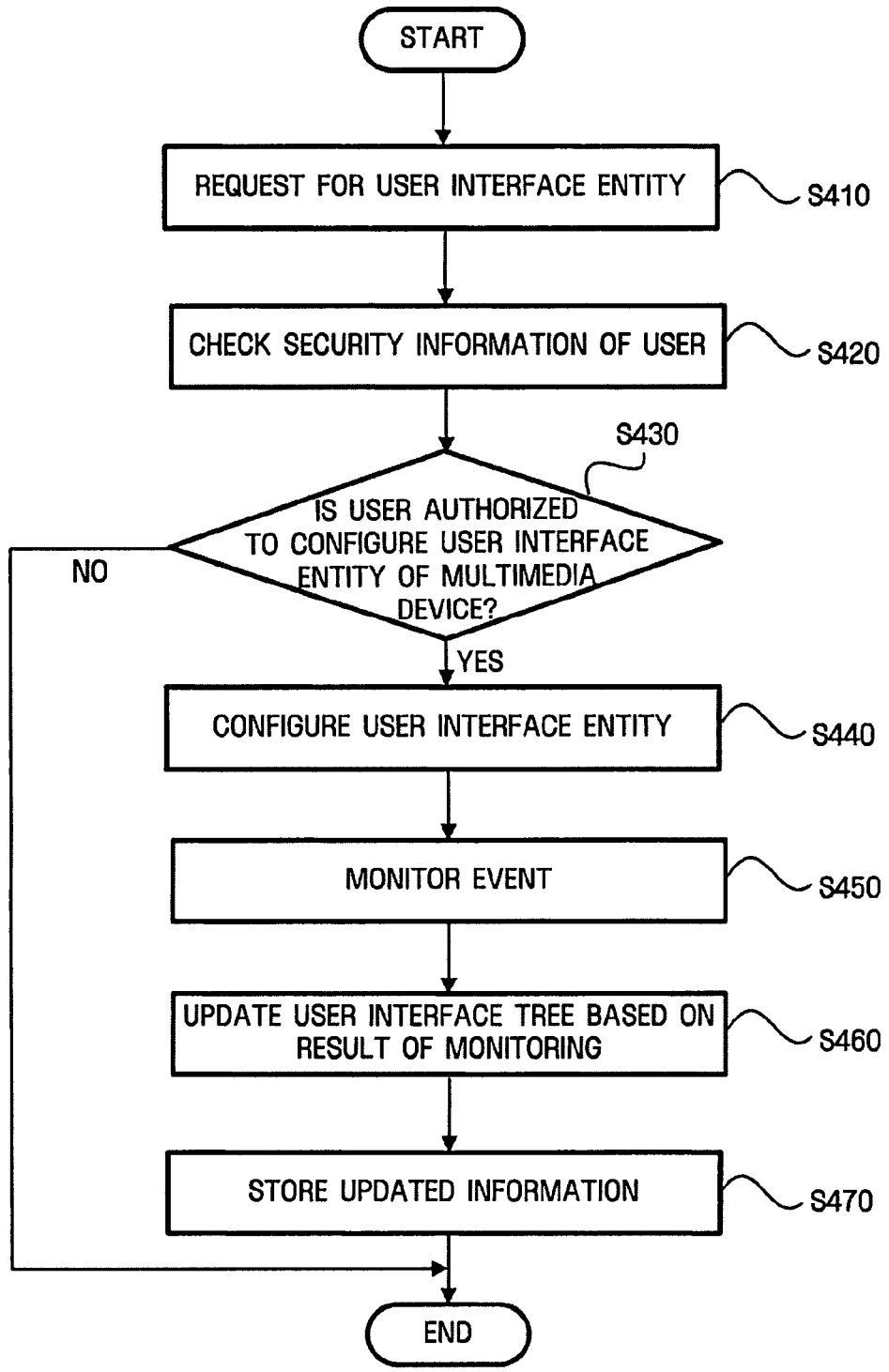

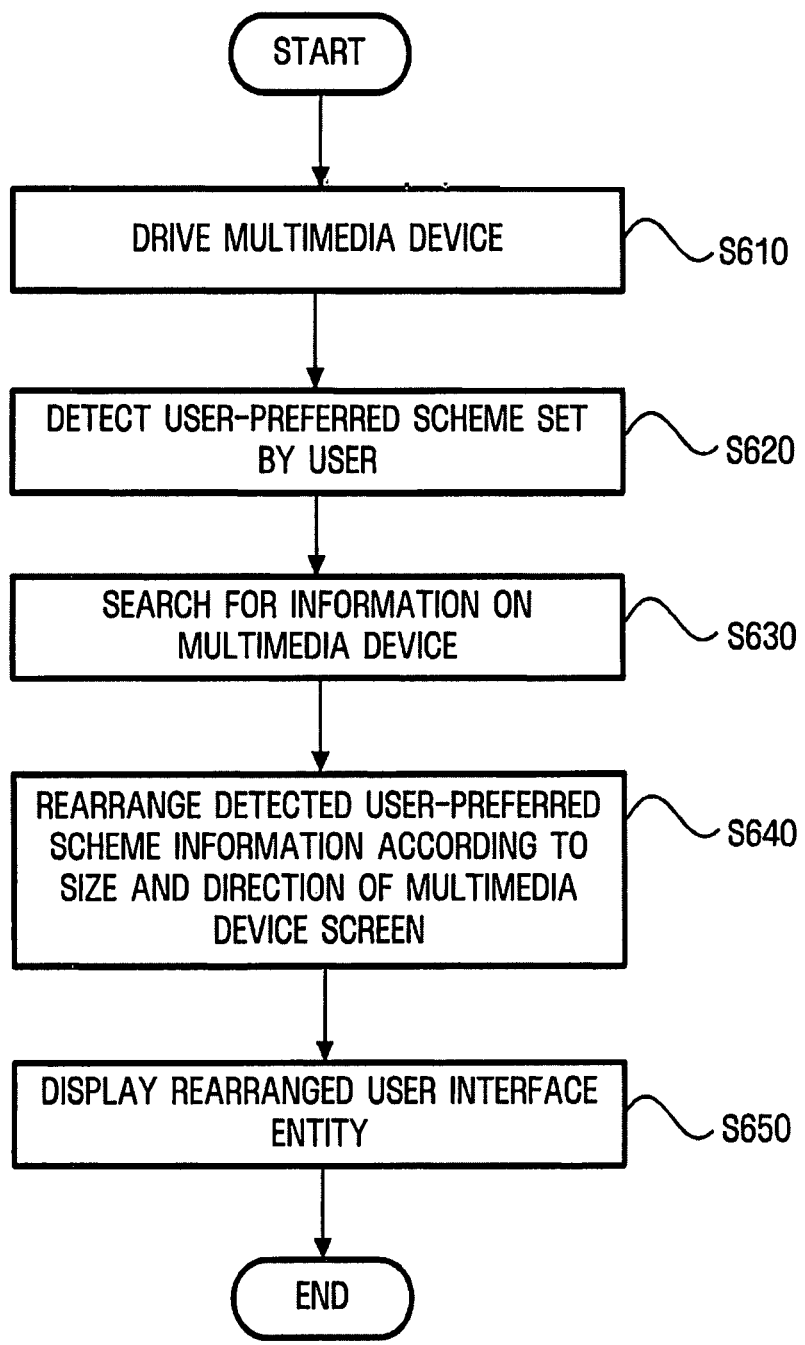

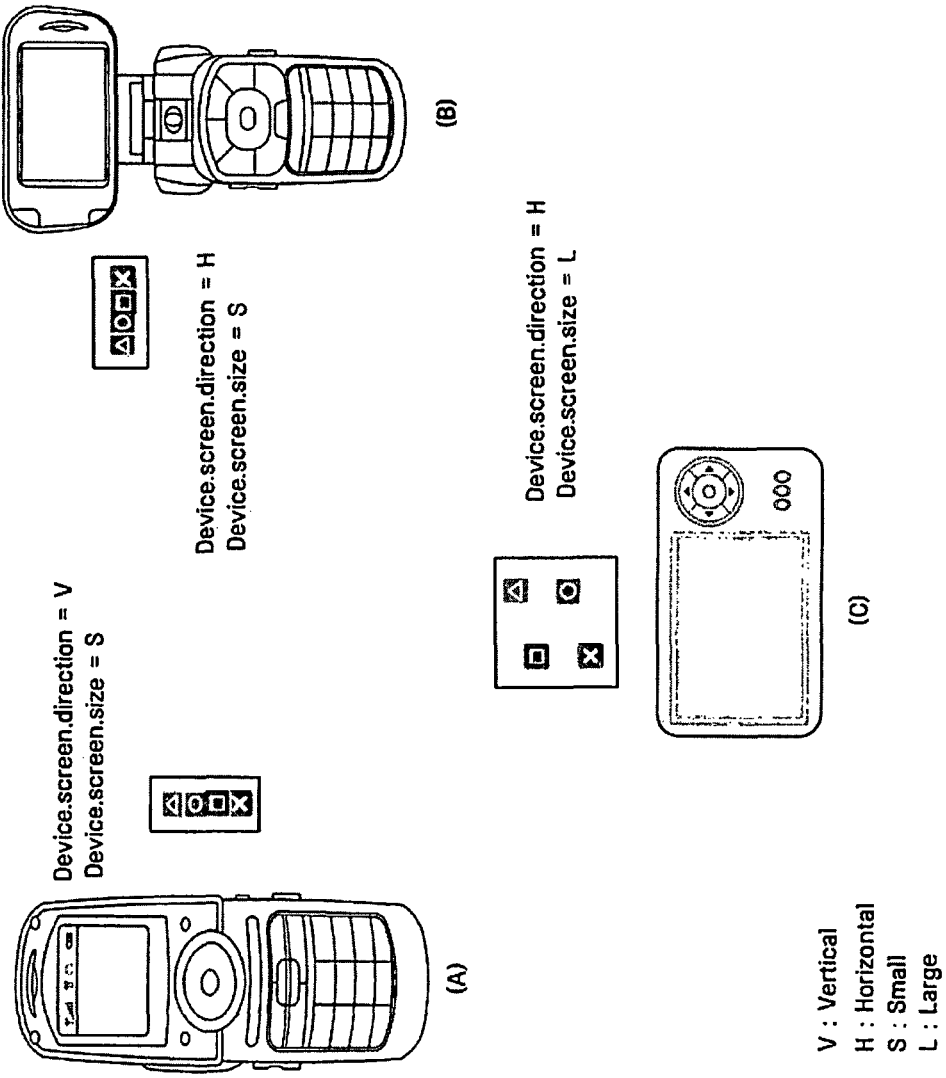

APPARATUS AND METHOD FOR SETTING USER INTERFACE ACCORDING TO USER PREFERENCE

CROSS-REFERENCE TO RELATED APPLICATION

This application is based on and claims priority from Korean Patent Application No. 10-2006-0045850 filed on May 22, 2006, in the Korean Intellectual Property Office, the disclosure of which is incorporated herein in its entirety by reference.

BACKGROUND OF THE INVENTION

1. Field of the Invention

The present invention relates to an apparatus and method for setting a user interface according to user preferences, and more particularly, to setting a user interface according to user preferences, in which the user interface can be set up based on the user preferences and synchronized so as to be used in other devices.

2. Description of the Related Art

Users interact with information devices through user interfaces. These user interfaces have structures, and are displayed by software using graphics.

The user interfaces in most devices have such a configuration that they cannot be added to or deleted from by the users. Accordingly, unless user responses and process flow are considered during the design process, inconvenience and repeated loads will occur. As a result, various attempts have been made to improve user interface configurations.

Most devices have their own user interfaces that users must use to operate the device, which is not optimal.

In order to overcome such an inconvenience, some mobile terminals provide functions that allow users to change the order of specific menus or icons.

However, such functions still do not allow the users to overcome restrictions in menu management, synchronizing the user-interface setup among the terminals, and re-using the user interface.

In addition, the user interface configuration is customized information including the frequently used operations and user preferences, and in order to maximize effectiveness should be consistent in devices of a similar category, as well as when carrying out a specific operation.

That is, in the case of the mobile terminal, it is time consuming for the user to have to repeat the same task in order to set up the user interface or transmit the same content.

Japanese Unexamined Patent No. 2003-005883 (Method and System for Setting Terminal Function, Terminal, and Program) discloses a method of setting a terminal function to configure a menu screen by downloading a file displaying the menu screen. The prior art relates to a method of transmitting and receiving files necessary for the screen configuration of the terminal from a server, but does not disclose a technique for having each element forming the user interface as a management tree and linking a system through synchronization.

SUMMARY OF THE INVENTION

In view of the above, it is an object of the present invention to provide a user interface that can be set up according to user preferences.

The object, features and advantages, of the present invention will become clear to those skilled in the art upon review of the following description, attached drawings and appended claims.

According to an aspect of the present invention, there is provided an apparatus for setting a user interface according to user preferences, the apparatus including a user-interface-configuration unit that is notified of an update and rearrangement of a predetermined user interface element by a user; a user-information-management unit that manages security information of the user that reconfigures the user interface element; and a user-interface tree-management unit that reconfigures a predetermined a user interface tree based on the reconfigured user interface element.

According to another aspect of the present invention, there is provided a method of setting a user interface according to user preferences, the method including being notified of an update of a predetermined user interface element from a user; generating a predetermined user interface event when the user interface element is updated by the user; and managing user-interface tree information so that it corresponds to the generated user interface event.

According to another aspect of the present invention, there is provided a method of setting a user interface according to user preferences, the method including requesting user interface information from a device; receiving the user interface information; synchronizing user interfaces based on the user interface information; and storing the user interface information.

BRIEF DESCRIPTION OF THE DRAWINGS

The above and other features and advantages of the present invention will become more apparent by describing in detail exemplary embodiments thereof with reference to the attached drawings, in which:

FIG. 3B illustrates a correlation among nodes of a user interface tree in an apparatus for setting the user interface based on user preferences according to a further exemplary embodiment of the present invention;

FIG. 4 illustrates a process of updating a user interface entity in a method of setting the user interface based on user preferences according to a further exemplary embodiment of the present invention;

FIG. 6A is a flow chart illustrating a process of displaying a user interface that fits a multimedia device screen in a method of setting the user interface based on user preferences according to a further exemplary embodiment of the present invention, and FIG. 6B illustrates how the user interface fits the multimedia device screen;

DETAILED DESCRIPTION OF THE EXEMPLARY EMBODIMENTS

Figure 1:
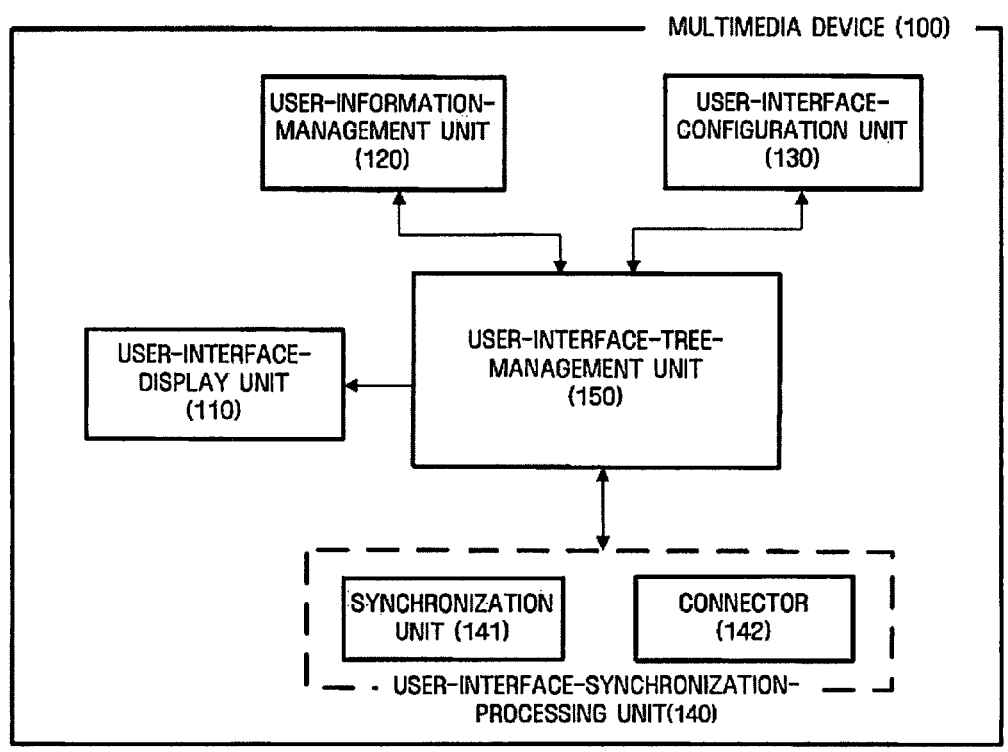
FIG. 1 is a block diagram illustrating an exterior of an apparatus for setting a user interface based on user preferences according to an exemplary embodiment of the present invention.

Exemplary embodiments of the present invention will be described in detail with reference to the accompanying drawings. Aspects and advantages of the present invention, and methods of accomplishing the same, may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention.

FIG. 1 is a block diagram illustrating an exterior of an apparatus for setting a user interface based on user preferences according to an exemplary embodiment of the present invention.

Referring to FIG. 1, a multimedia device 100 includes a user-interface-display unit 110, a user information-management unit 120, a user-interface-configuration unit 130, a user interface synchronization-processing unit 140, and a user-interface-tree-management unit 150. Here, the multimedia device is a display device providing predetermined images and sound, and may be a mobile phone, a personal digital assistant (PDA), or a portable multimedia player (PMP).

Here, the term "module" means, but is not limited to, a software or hardware component, such as a Field Programmable Gate Array (FPGA) or an Application Specific Integrated Circuit (ASIC), which executes certain tasks. A module may advantageously be configured to reside in the addressable storage medium, and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The user-interface-display unit 110 outputs the components of the user interface through a display unit (e.g. a multimedia device screen). Here, the user-interface-display unit 110 rearranges user interface information, and outputs it as it appears in the multimedia device.

In addition, the user-interface-display unit 110 may display the operations performed by a user.

The user information-management unit 120 manages security information of the user who is authorized to use a predetermined multimedia device 100. Here, access to the predetermined multimedia device 100 and provided user interface-configuration information is restricted according to the security information of the user.

For example, the managing of the information of the user authorized to use the predetermined multimedia device 100 is initially executed by the user having owner authority. User interface elements may be thenceforth changed or rearranged by determining whether the access to the multimedia device 100 should be granted according to additional security information of the user.

The user-interface-configuration unit 130 is notified of an update of the user interface element and the rearrangement thereof by the user. For example, the user-interface-configuration unit 130 changes a property value of the user interface element. Here, the information of the user interface elements that have been added, changed, or deleted by the user is detected and confirmed via the user-interface-tree-management unit 150, and used when renewing actual tree information. Here, the user interface element refers to a user interface entity and a scheme, which will be described in detail hereinafter with reference to FIG. 3.

In addition, the user-interface-configuration unit 130 can display overall configuration information of the user interface tree, and the user may select a specific element and execute an operation with respect thereto.

The user interface synchronization-processing unit 140 transmits information on the user interface-configuration to the predetermined multimedia device 100, is linked to the user-interface-tree-management unit 150, and receives a list of the user-interface-tree information therefrom.

In addition, the user interface synchronization-processing unit 140 is divided into a synchronization unit 141 and a connector 142.

The synchronization unit 141 transmits user interface entity information to other multimedia devices or configures the same user interface tree structure by receiving the entity information from the other multimedia devices.

For example, each synchronization unit 141 of the user-interface-tree-management unit 150 in a transmitter and a receiver synchronizes the user interfaces based on node information in the user interface tree that is managed by the synchronization unit 141.

The connector 142 supports a protocol that transmits the data transmitted from the synchronization unit 142 to other multimedia devices. Here, a protocol configuration includes tree node location information, node information, device information, and user information.

The user-interface-tree-management unit 150 manages all the user interface elements in the multimedia device 100.

For example, the user-interface-tree-management unit 150 generates and manages information on the properties of the user interface elements, changed entity, and configuration by the node, and manages the overall user interface information in the shape of a tree. Hereinafter, a detailed description on the user-interface-tree-management unit 150 will be described with reference to FIG. 2.

Figure 2:
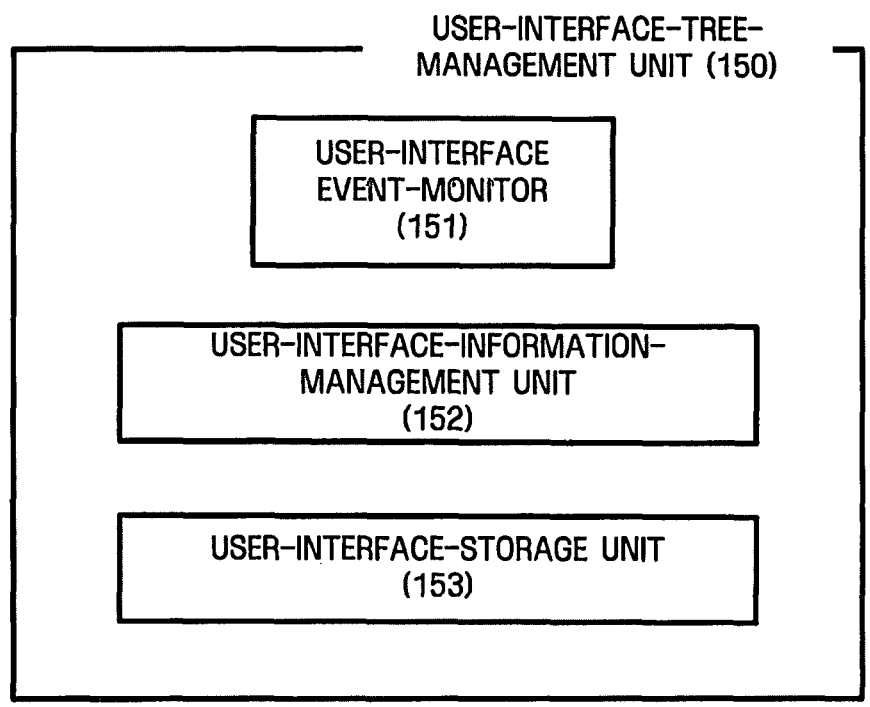
FIG. 2 is an internal block diagram illustrating user-interface-tree-management in an apparatus for setting a user interface based on user preferences according to another exemplary embodiment of the present invention.

FIG. 2 is an internal block diagram illustrating a user-interface-tree-management in an apparatus for setting a user interface based on user preferences according to another exemplary embodiment of the present invention.

Referring to FIG. 2, a user-interface-tree-management unit 150 includes a user-interface-event monitor 151, a user-interface-information-management unit 152, and a user interface storage unit 153.

If there is a change in a user interface entity, the user-interface-event monitor 151 generates a specific event, and transmits it to the user-interface-information-management unit 152. Here, the user-interface-information-management unit 152 executes internal tasks according to the property of the event for specific processing.

Here, the user interface event includes UI_CREATE (generated when a new user interface entity is created), UI_UPDATE (generated when an existing user interface is updated), and UI_DESTROY (generated when the existing user interface is destroyed).

The user-interface-information-management unit 152 manages the information on the user interface elements in a tree structure, i.e., it updates and manages the user-interface-tree information through the user-interface-event monitor 151 when an event occurs in order to correspond to the user interface event that occurred.

For example, the user-interface-information-management unit 152 updates the node corresponding to the user interface entity within the tree when creating, updating, and destroying a specific user interface entity, which renews the overall user-interface-tree information.

In addition, the user-interface-information-management unit 152 executes operations such as create_node (the creation of a new node), update_node (a update on an existing node), and destroy_node (the destruction of the existing node) in order to renew the user-interface-tree information.

The user interface storage unit 153 stores the user-interface-tree information (e.g. the user interface entity information) that is updated by the user-interface-information-management unit 152. Here, the user interface storage unit 153 may exist in a specific file system in the multimedia device 100 or be stored in a remote user interface server that integratedly manages the overall user interface information.

FIG. 3 illustrates a correlation between the structure of a user interface and the nodes of a user interface tree in an apparatus for setting the user interface based on user preferences according to a further exemplary embodiment of the present invention.

Figure 3A:
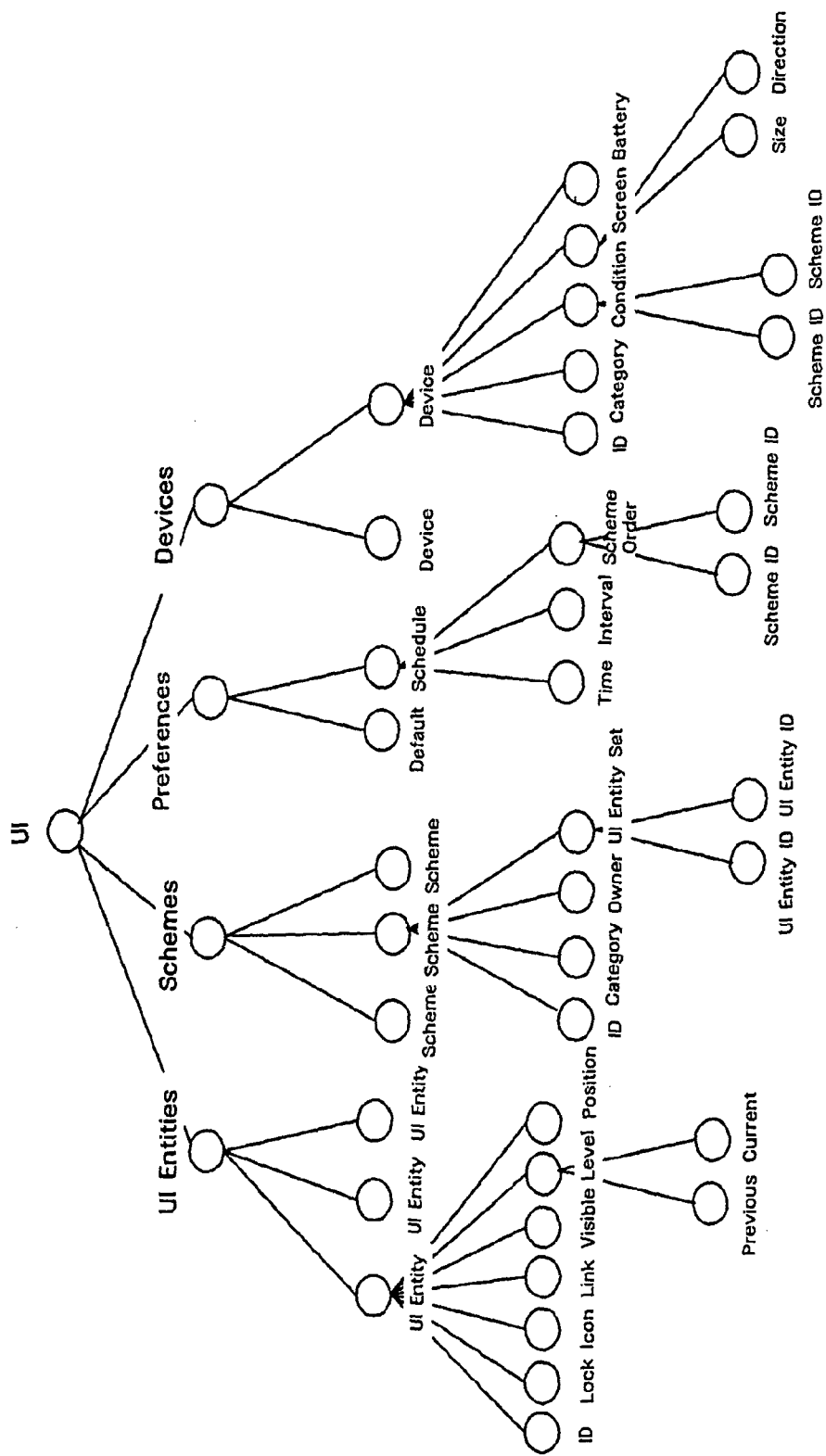
FIG. 3A illustrates a correlation between the structure of a user interface and the nodes of a user interface tree in an apparatus for setting the user interface based on user preferences according to a further exemplary embodiment of the present invention.

Referring to FIG. 3A, the user interface tree has a hierarchical structure and each node is classified into four structures (e.g. a user interface entity, a scheme, a preference, and a device). Here, a new node can be defined and added to the existing nodes of the user interface, and thus belong to the category of the present invention.

A user interface entity set is a parental node of the user interface entities including a plurality of the user interface entities. Here, the user interface entity refers to an individual element on a screen. That is, the user interface entity is the individual element of a means of expression that can exist visually, audibly, and tactilely.

For example, a graphical element represented by an icon, the vibration of a device, the motions of some components and the sound effects may be used as a user interface entity.

In addition, the user interface entity has state variables and action variables needed for the control of operations, and each property of the user interface entity has an updated state that is maintained when a scheme is made.

Further, the user interface entity includes "ID" that indicates the ID value of the user interface node; "Lock" that indicates whether the user interface entity has been created, updated, or destroyed according to user preferences; "Icon" that indicates an object representing the corresponding user interface element; "Link" that indicates an object address that can be executed by the corresponding user interface element; "Visible" that indicates whether an icon is available; "Level" that indicates a relative depth in a screen; and "Position" that indicates a relative coordinate value in the screen.

A scheme set is a parental node of the schemes, and includes a plurality of user interface entities. Here, the scheme is formed of a combination of the user interface entities.

In addition, the scheme includes "ID" that indicates an ID value of the scheme node; "Category" that indicates a classification type of the scheme; "Owner" that indicates information on the owner of the scheme; and "User Interface EntitySet" that indicates information on the user-interface-entity configuration included in the scheme.

Further, the user preference refers to a configuration node of a scheme that is applied to a predetermined device, and includes: "Default" that indicates a default scheme; "Schedule" that indicates action events or scheduled set-up based on time in the device; "Time" that indicates the time when the scheduled set-up is; "Interval" that indicates how frequently the update is executed; and "SchemeOrder" that indicates a list of IDs of each scheme that is hierarchically applied.

A device set refers to a node that configures the property of the devices to which a user interface is applied. Here, the device refers to the node indicating configuration information of each device.

In addition, the device includes "ID" that indicates an ID value of the device node; "Category" that indicates a classification type of the device; "Condition" that indicates each property as a variable in the device; "Screen" that indicates state variables of a screen (e.g. a screen size and a screen direction); and "Battery" that indicates a battery status (e.g. a battery level and battery information indicating a user interface display mode).

FIG. 3B illustrates a correlation among nodes of a user interface tree.

Referring to FIG. 3B, an entity node includes "ID", "Lock", "Icon", "Link", "Visible", "Level", and "Position" and a scheme node is formed of a set of the user interface nodes including "ID", "Category", "Owner" and "User Interface EntitySet". In addition, a preference node is formed of a set of the scheme nodes including "Default", "Schedule", "Time", "Interval", and "SchemeOrder".

That is, the user interface entity is formed of each user interface element, the scheme is formed of a combination of the user interface entities, and the user preference value is formed of the schemes that are set up differentially.

FIG. 4 illustrates a process of updating a user interface entity in a method of setting the user interface based on user preferences according to a further exemplary embodiment of the present invention.

First, when a user drives a multimedia device 100, and requests user-interface-entity configuration (e.g. the creation, update, and destruction thereof) via a user-interface-configuration unit 130 (S410), a user information-management unit 120 checks user security information with respect to the multimedia device 100 (S420), and determines whether the user is authorized to execute the user interface configuration (S430). Here, the access to the multimedia device 100 and the user interface configuration information is restricted, and it is determined whether the user interface entity is configurable according to the user security information managed by the user information-management unit 120

If it is determined that the user is authorized to execute the configuration of the multimedia device 100 (S430), the user configures the user interface entity of the multimedia device 100 (S440).

Once the user interface configuration has been competed by the user, a user-interface-event monitor 151 of a userinterface-tree-management unit 150 monitors an event created by the user, i.e., the user-interface-entity configuration (or re-configuration) (S450).

The user-interface-event monitor 151 transmits the result of the monitoring to a user-interface-information-management unit 152 that updates the user interface tree based on the transmitted result (S460).

Then, a user interface storage unit 153 stores the updated information (S470).

For example, a user updates specific node information, creates a new node, or destroys a specific node via the user-interface-configuration unit 130 generating an event. The user-interface-event monitor 151 transmits the generation of the event to the user-interface-information-management unit 152.

The user-interface-information-management unit 152 reflects the result of the event, and updates the user interface tree based on the generated event (e.g. the creation of the new node).

Figure 5:
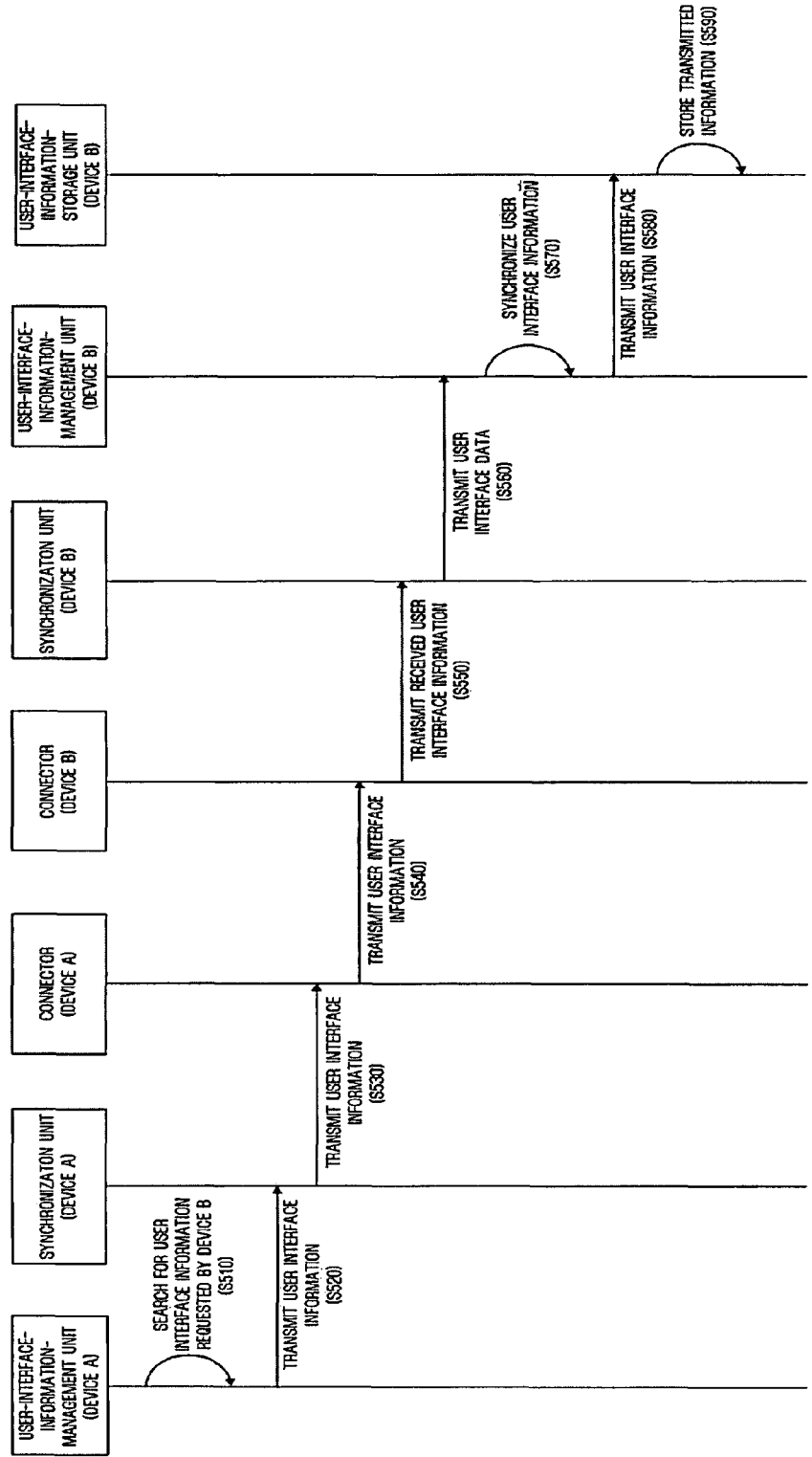
FIG. 5 is a flow chart illustrating a process of synchronizing a user interface in an apparatus for setting the user interface based on user preferences according to a further exemplary embodiment.

FIG. 5 is a flow chart illustrating a process of synchronizing a user interface in an apparatus for setting the user interface based on user preferences according to a further exemplary embodiment. Here, devices A and B exist, and device B requests information on device A, and describes how an update is executed.

First, a user-interface-information-management unit of the device A searches for user interface information requested by the device B (S510).

Next, the user-interface-information-management unit of the device A transmits the searched user interface information to a synchronization unit of the device A (S520), which transmits the received user interface information to the device B via a connector of the device A (S530 and S540).

The connector of the device B receives the user interface information transmitted from the device A (S550), and transmits it to a user-interface-information-management unit of the device B via the synchronization unit of the device A (S560).

The user-interface-information-management unit of the device B synchronizes a user interface tree based on the user interface information transmitted from the device A (S570). That is, the user-interface-information-management unit of the device B reflects the user interface information transmitted from the device A on the device B, and updates the user interface tree.

The user interface storage unit of device B stores the user interface information transmitted from the user-interface-information-management unit (S580 and S590).

FIG. 6A is a flow chart illustrating a process of displaying a user interface that fits to a multimedia device screen in a method of setting the user interface based on user preferences according to a further exemplary embodiment of the present invention and FIG. 6B illustrates the displaying of the user interface that fits to the multimedia device screen.

Referring to FIG. 6A, when a user drives the multimedia device 100 (S610), a user-interface-tree-management unit 150 detects user-preferred scheme information set by the user (S620).

Next, the user-interface-tree-management unit 150 searches for device information of the multimedia device 100 (S630). Here, the information refers to the size (e.g. large vs. small) and direction (vertical vs. horizontal) of a screen of the multimedia device 100. In addition, the information is searched for in order to rearrange the detected user-preferred scheme so that it fits to the screen of the multimedia device 100.

The user-interface-tree-management unit 150 rearranges the detected user-preferred scheme information according to the searched device information 00 (S640).

For example, if the result of the device information search shows that the screen is large and oriented in a vertical direction, the set user-preferred scheme element is enlarged and vertically rearranged. If the screen size and direction of the set user-preferred scheme element is the same as those of the searched multimedia device 100, the rearrangement is not executed.

A user entity is displayed based on the rearranged user-preferred scheme element (S650).

FIG. 6B illustrates how the user interface fits the multimedia device screen.

Referring to FIG. 6B, if the multimedia device 100 used by the user is A, the result of the device information shows that the screen of the device A is small and oriented in a vertical direction.

Accordingly, the user-preferred scheme element set by the user is rearranged on the device A, i.e., the user interface entity is arranged vertically, and displayed on the screen of the device A.

In addition, if the multimedia device 100 used by the user is B, the result of the device information shows that the screen of the device B is small and oriented in a horizontal direction.

Accordingly, the user-preferred scheme element set by the user is rearranged on the device B, i.e., the user interface entity is arranged horizontally, and displayed on the screen of the device B.

Further, if the multimedia device 100 used by the user is C, the result of the device information shows that the screen of device C is large and oriented in a horizontal direction.

Accordingly, the user-preferred scheme element set by the user is rearranged on the device C and displayed on the screen of device C.

Figure 7:
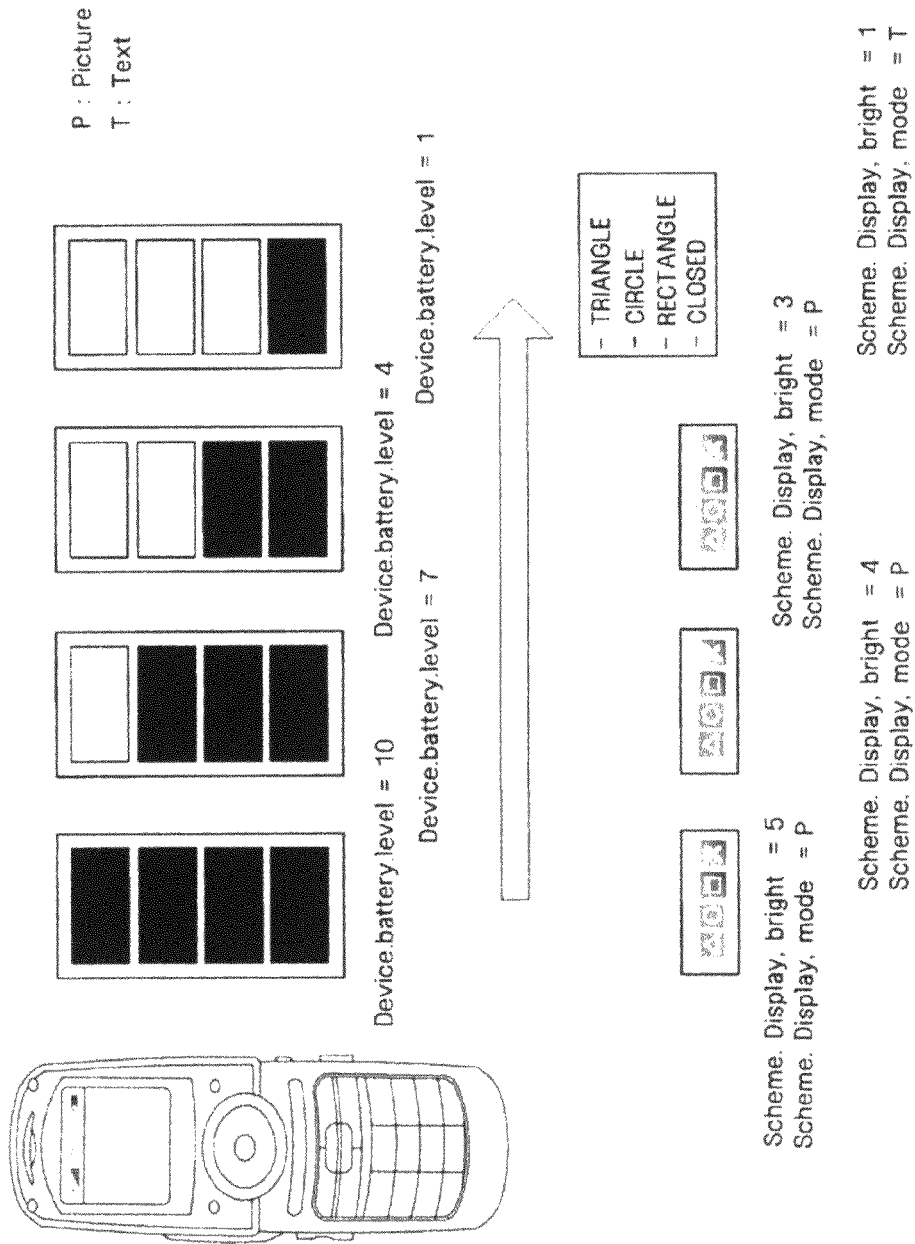
FIG. 7 illustrates how a user interface is displayed based on a battery status in a method of setting the user interface based on user preferences according to a further exemplary embodiment of the present invention.

FIG. 7 illustrates how a user interface is displayed based on a battery status in a method of setting the user interface based on user preferences accordingly to a further exemplary embodiment of the present invention.

Referring to FIG. 7, a user drives a multimedia device 100 and a user-interface-tree-management unit 150 detects user-preferred scheme information set by the user.

The user-interface-tree-management unit 150 determines the battery level of the multimedia device 100. If it is determined that the battery level is high, the set user-preferred scheme element is displayed brightly. Here, the user-preferred scheme element is output in "Picture" mode.

For example, if the battery level is 10 and the display level is 5, the display mode is set to "Picture" and the user interface is displayed pictorially.

In addition, if it is determined that the battery level is medium, the set user-preferred scheme element is displayed less brightly. Here, the user-preferred scheme element is output in "Picture" mode.

For example, if the battery level is 7 and the display level is 4, the display mode is set to "Picture" and the user interface is displayed pictorially.

Further, if it is determined that the battery level is low, the set user-preferred scheme element is displayed at minimal brightness. Here, the user-preferred scheme element is output in "Text" mode.

For example, if the battery level is 1 and the display level is 1, the display mode is set to "Text" and the user interface is displayed textually.

Figure 8:
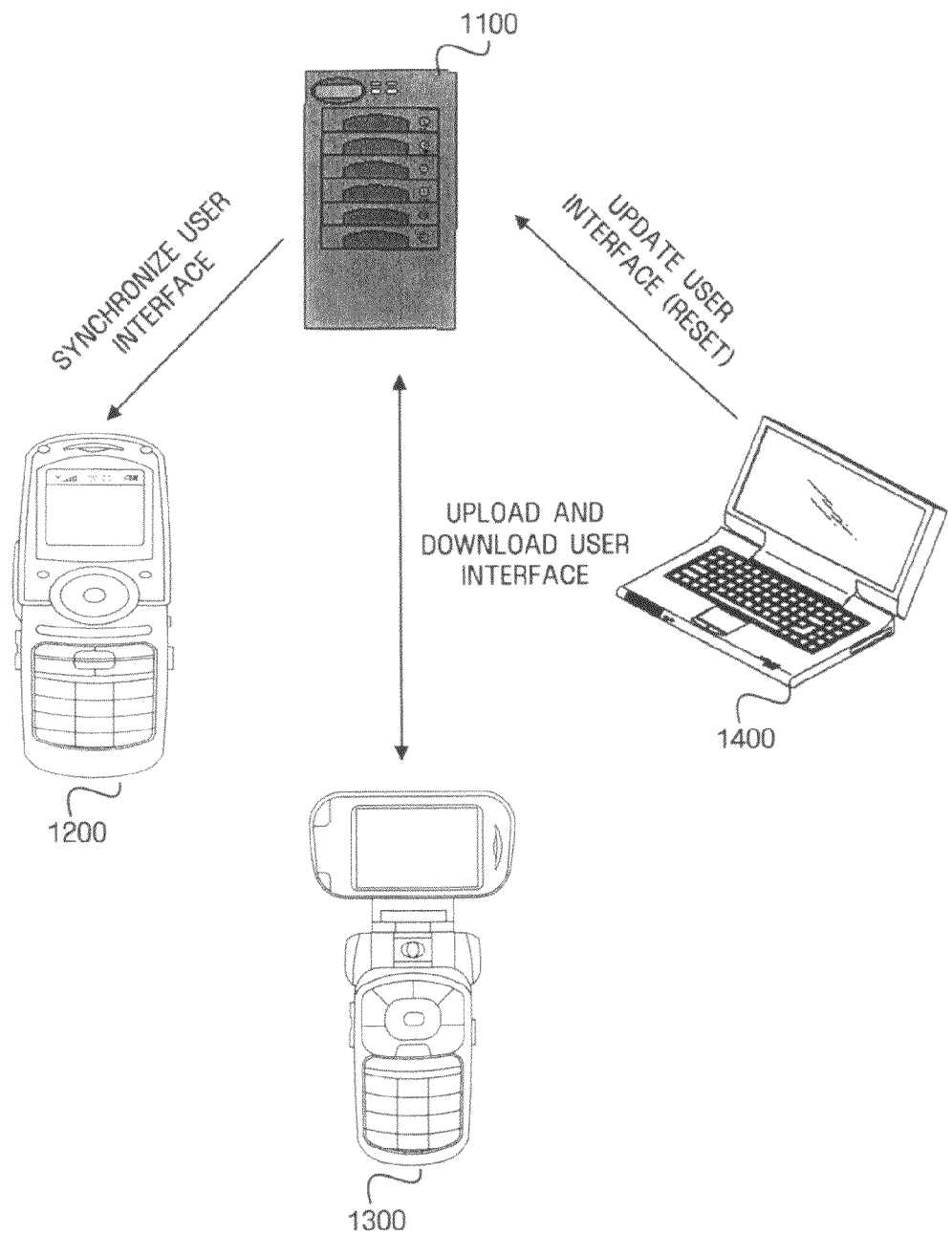
FIG. 8 illustrates how a remote user manages a user interface of a specific device in a method of setting the user interface based on user preferences according to a further exemplary embodiment of the present invention

FIG. 8 illustrates how a remote user manages a user interface of a specific device in a method of setting the user interface based on user preferences accordingly to a further exemplary embodiment of the present invention.

Referring to FIG. 8, a user-interface-tree-management unit 150 may execute reconfiguration of the user interface in a multimedia device 100 by the user using the same. In addition, the user-interface-tree-management unit 150 may reconfigure the user interface in connection with a user interface server 1100 that stores user interface information on a plurality of devices used among a plurality of users, and provides a telecommunications function For example, the user is connected to the user interface server 1100, and accesses user-interface-tree information with respect to specific devices 1200, 1300, and 1400 of an authorized user. Here, the user may preferentially his/her access information.

The user interface reconfigured via the user interface server 1100 is stored in the user interface server 1100. Then, the user accesses the user interface server 1100 via the device (e.g. device 1200) when using the device (e.g. the device, 1200), receives information on the reconfigured user interface, and may use and configure it in the device (e.g. device 1200).

As described above, according to an apparatus for, and a method of, setting a user interface according to user preferences, the following effects can be anticipated.

First, one advantage of the present invention is that the user interface can be set reflecting the user preferences, and the set user interface can be synchronized with other devices and used.

Second, a further advantage of the present invention is that user interface configuration can be synchronized with all the devices that belong to one user, thereby enhancing convenience and usability.

Third, a further advantage of the present invention is that the user interface can be reconfigured in various ways and specific user-interface-configuration information can be easily exchanged among users by managing the user interface information via a user interface tree.

The exemplary embodiments of the present invention have been explained with reference to the accompanying drawings, but it will be apparent to those skilled in the art that various modifications and changes may be made thereto without departing from the scope and spirit of the invention. Therefore, it should be understood that the above exemplary embodiments are not restrictive but illustrative in all aspects.

What is claimed is:

1. An apparatus for setting a user interface according to user preferences, the apparatus comprising:
    a user-interface-configuration unit which is configured to be notified of a reconfiguration of at least one of appearance, position, and functionality of a user interface element by a user;
    a user-information-management unit which manages security information of the user that reconfigures the user interface element; and
    a user-interface-tree-management unit implemented on a computer which reconfigures a corresponding element in a user-interface tree based on the reconfiguration of the user interface element,
    wherein if the apparatus detects change made by the user to the user interface element, the user interface configuration unit is notified of the reconfiguration to the corresponding element stored in the user-interface tree and the user-interface tree is modified based on the detected change,
    wherein the user-interface tree is a hierarchical tree comprising a device types level, and
    wherein the user-interface tree comprises information about at least two different devices.

2. The apparatus of claim 1, wherein the user-interface-tree-management unit comprises:
    a user-interface-event monitor that generates a user interface event when the user interface element is reconfigured by the user;
    a user-interface-information-management unit that manages user-interface-tree information based on the user interface event; and
    a user interface storage unit which stores the updated user-interface-tree information based on the generation of the user interface event.

3. The apparatus of claim 1, further comprising a user interface synchronization-processing unit which transmits the user-interface-tree information to other devices, and synchronizes the user-interface-time information.

4. The apparatus of claim 1, wherein the user interface element has a tree structure, and a new node of the user interface element is added.

5. The apparatus of claim 4, wherein the new node of the user interface element is at least one of a user interface entity, a scheme, a user preference, and a device.

6. The apparatus according to claim 5, wherein the user interface entity comprises an individual element of a means of expression that exists visually, audibly, or tactilely.

7. The apparatus according to claim 5, wherein the scheme is a combination of user interface entities.

8. The apparatus according to claim 1, wherein the reconfiguration comprises updating, rearranging, or deleting at least one of appearance, position, and functionality of the user interface element.

9. The apparatus according to claim 1, further comprising a display unit connected to a user-interface-tree-management unit.

10. The apparatus according to claim 1, wherein the user interface element is a menu item that forms the user interface and wherein the user-interface-configuration unit is notified when position of the menu item is changed.

11. The apparatus of claim 1, wherein the reconfiguration of the user interface element by the user comprises changing a position of the user interface element displayed in the user interface based on at least one of size of a device, orientation of a device, and available resources.

12. The apparatus of claim 1, wherein the user-interface-configuration unit is configured to be notified of a display arrangement of user interface elements including the user interface element where the user interface elements are icons displayed on the user interface and wherein the display arrangement varies based on at least one of size of a device, orientation of a device, and available resources.

13. The apparatus of claim 12, wherein each user interface of a plurality of user devices is arranged based on the display arrangement.

14. The apparatus of claim 1, wherein the user-interface tree stores rules for displaying the user interface element on the user interface which are applied to different user interfaces of a plurality of user devices.

15. The apparatus of claim 1, wherein the user-interface tree comprises nodes representing user interface elements, nodes representing schemes that are applied to at least one of the user interface elements, nodes representing user preferences, and nodes representing devices.

16. The apparatus of claim 1, wherein the user-interface configuration unit is notified if the user manually changes on a user device at least one of the appearance, position, and functionality of the user interface element, wherein the security information of the user comprises data indicating which user is authorized to access the user device.

17. The apparatus of claim 1, wherein:
the user-interface tree is the hierarchical tree which further comprises: user preferences level, scheme types level, and user entity level,
the user entity level comprises attributes of a user interface element which is an individual element of a user interface,
the scheme types level is a higher level than the user entity level and comprises arrangement of a plurality of user entities,
the user preferences level is a higher level than the scheme types level and comprises a plurality of schemes and additional information for implementing a respective scheme, and
the device types level is a higher level than the user preferences level and comprises properties of devices to which the user interface applies.

18. The apparatus of claim 1, wherein the user-interface tree is the hierarchical tree with a plurality of nodes, said nodes identify attributes of the user-interface and are applicable to at least one of user devices.

19. The apparatus of claim 1, wherein the device types level indicates a classification type of a respective device.

20. A method of setting a user interface according to user preferences, the method comprising:
being notified of an update of at least one of appearance, position, and functionality of a user interface element by a user;
generating a user interface event when the user interface element is updated by the user; and
managing an element in user-interface-tree information, that corresponds to the updated user interface element, based on the generated user interface event,
wherein said being notified of the update comprises: detecting a change made by the user to the user interface element and notifying of the reconfiguration to the corresponding element stored in the user-interface tree, and
wherein the user-interface tree information is modified based on the detected change,
wherein the user-interface tree is a hierarchical tree comprising a device types level, and
wherein the user-interface tree comprises information about at least two different devices.

21. The method of claim 20, further comprising determining whether the user is authorized to update the user interface element based on the security information of the user when the user requests to update the user interface element.

22. The method of claim 20, wherein the user-interface-tree information is transmitted to another device and synchronized with the other device.

23. The method of claim 20, wherein the user interface element is in the shape of a tree structure, and a new node of the user interface element is added.

24. The method of claim 23, wherein the new node of user interface element is at least one of a user interface entity, a scheme, a user preference, and a device.

25. The method of claim 20, wherein the user-interface tree is the hierarchical tree with a plurality of nodes, said nodes identify attributes of the user-interface and are applicable to at least one of user devices.

26. An apparatus for setting a user interface according to user preferences, the apparatus comprising:

a user-interface-configuration unit which is configured to be notified of a reconfiguration of at least one of appearance, position, and functionality of a user interface element by a user;
a user-information-management unit which manages security information of the user that reconfigures the user interface element; and
a user-interface-tree-management unit implemented on a computer which reconfigures a corresponding element in a user-interface tree based on the reconfiguration of the user interface element,
wherein if the apparatus detects change made by the user to the user interface element, the user interface configuration unit is notified of the reconfiguration to the corresponding element stored in the user-interface tree and the user-interface tree is modified based on the detected change, and
wherein the user interface element comprises an interface identifier, a lock that indicates whether the user interface element has been created, updated, or destroyed, and a link that indicates an object address that can be executed by the user interface element and wherein the user interface configuration unit is automatically notified of the reconfiguration to the user interface element that corresponds to the element stored in the user-interface-tree.

27. An apparatus for setting a user interface according to user preferences, the apparatus comprising:
a user-interface-configuration unit which is configured to be notified of a reconfiguration of at least one of appearance, position, and functionality of a user interface element by a user;
a user-information-management unit which manages security information of the user that reconfigures the user interface element; and
a user-interface-tree-management unit implemented on a computer which reconfigures a corresponding element in a user-interface tree based on the reconfiguration of the user interface element,
wherein if the apparatus detects change made by the user to the user interface element, the user interface configuration unit is notified of the reconfiguration to the corresponding element stored in the user-interface tree and the user-interface tree is modified based on the detected change, and
wherein the user-interface tree is a hierarchical tree further comprising: device types level, user preferences level, scheme types level, and user entity level.

28. A method of setting a user interface according to user preferences, the method comprising:
being notified of an update of at least one of appearance, position, and functionality of a user interface element by a user;
generating a user interface event when the user interface element is updated by the user; and
managing an element in user-interface-tree information, that corresponds to the updated user interface element, based on the generated user interface event,
wherein said being notified of the update comprises: detecting a change made by the user to the user interface element and notifying of the reconfiguration to the corresponding element stored in the user-interface tree, and
wherein the user-interface tree information is modified based on the detected change, and
wherein the user-interface tree is a hierarchical tree comprising: device types level, user preferences level, scheme types level, and user entity level.

* * * * *